(No Model.) 6 Sheets—Sheet 1.

S. W. LADD.
LASTING MACHINE.

No. 597,321. Patented Jan. 11, 1898.

Fig. 1

Witnesses:
M. M. Tuttle
A. M. Tuttle

Inventor
Sherman W. Ladd
by C. B. Tuttle
Attorney.

(No Model.) 6 Sheets—Sheet 3.

S. W. LADD.
LASTING MACHINE.

No. 597,321. Patented Jan. 11, 1898.

Witnesses:
M. M. Tuttle
A. M. Tuttle

Inventor:
Sherman W. Ladd
by C. B. Tuttle
Attorney.

(No Model.)  6 Sheets—Sheet 4.

S. W. LADD.
LASTING MACHINE.

No. 597,321.  Patented Jan. 11, 1898.

Witnesses:
M. M. Tuttle
A. M. Tuttle

Inventor,
Sherman W. Ladd
by C. B. Tuttle
Attorney.

(No Model.)

S. W. LADD.
LASTING MACHINE.

No. 597,321. Patented Jan. 11, 1898.

Witnesses:
M. M. Tuttle
A. M. Tuttle

Inventor,
Sherman W. Ladd
by C. B. Tuttle
Attorney.

(No Model.)  
6 Sheets—Sheet 6.

S. W. LADD.
LASTING MACHINE.

No. 597,321. Patented Jan. 11, 1898.

Witnesses.
M. M. Tuttle.
A. M. Tuttle

Inventor.
Sherman W. Ladd
by C. B. Tuttle
Attorney.

UNITED STATES PATENT OFFICE.

SHERMAN W. LADD, OF BEVERLY, MASSACHUSETTS.

LASTING-MACHINE.

SPECIFICATION forming part of Letters Patent No. 597,321, dated January 11, 1898.

Application filed April 13, 1897. Serial No. 631,942. (No model.)

*To all whom it may concern:*

Be it known that I, SHERMAN W. LADD, of Beverly, county of Essex, and Commonwealth of Massachusetts, have invented certain Improvements in Lasting-Machines, of which the following, read in connection with the accompanying drawings, is a specification.

This invention is embodied in lasting-machines of the character adapted for working on different parts of the upper successively, the lasting operation being performed progressively by repeated operations of the machine applied to different parts of the upper at different times.

As shown in the drawings, this invention is carried out with special regard for its adaptability to combine with and work in lasting-machines of the construction specified in Letters Patent of the United States numbered 584,744; but in the descriptive part of the specification care will be taken to disclose the general character of the invention and its adaptability by the use of ordinary mechanical skill for combination and use in other lasting-machines of the class or character indicated.

One object of this invention is to make provision for the tacks or other suitable fasteners employed in fastening the upper to the inner sole to be made to penetrate the upper and the inner sole while moving in a line oblique to the surface plane of the material penetrated thereby and go forwardly, converging mainly toward the middle or central plane—meaning a substantially central line or a plane including such lines at right angles to the sole or tread—of the shoe to thereby hold the strained upper and by its ingoing movement pull it more closely into place over the last.

Another object of this invention is to make provision for the work-presser in approaching the upper for pressing it over the inner sole to be moved theretoward in a path or plane oblique to the surface or part of the inner sole to be covered thereby and incidentally to arrange for movement of the presser toward the shoe-upper in planes of different inclination or attitudes relatively to the plane of the shoe-bottom, also to arrange for different pressers to operate at different times in a common position.

The invention includes other purposes of minor importance also and novel means for securing the same, as pointed out in the specification and the claims hereinafter written to cover the same.

Figure 1:
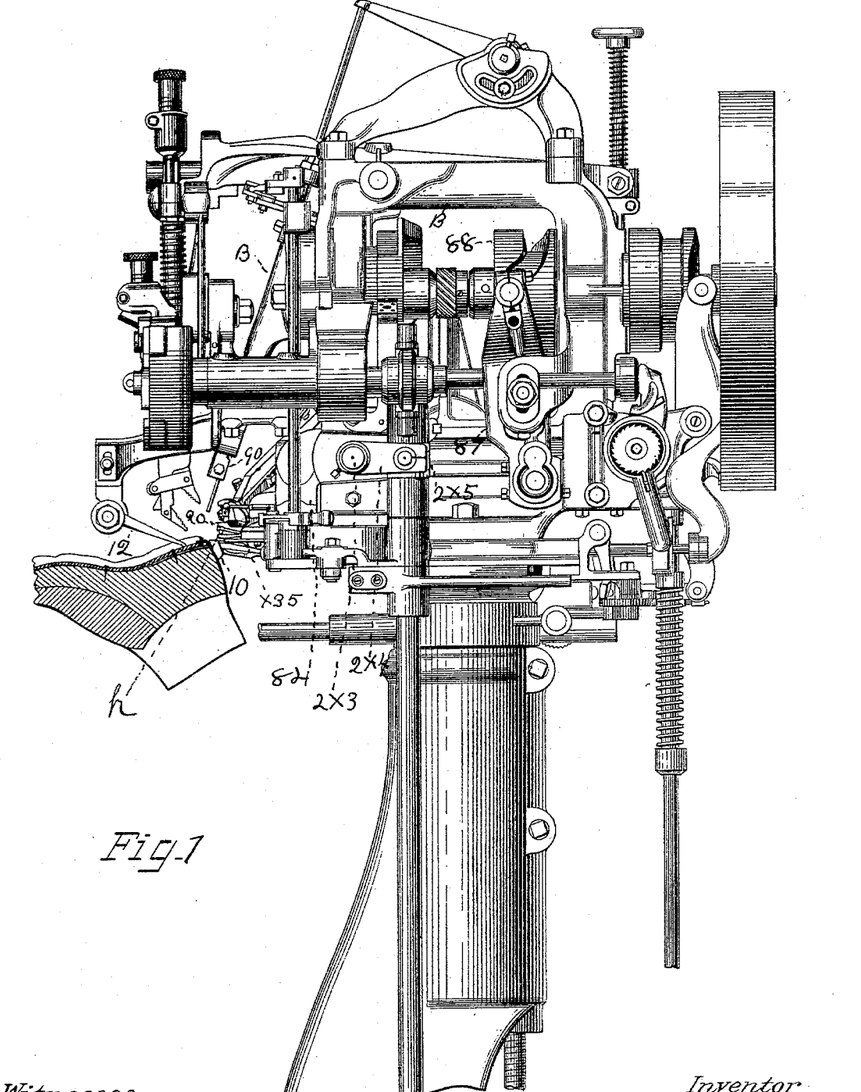
Figure 1 is a side elevation of a lasting-machine having this invention embodied therein.
Figure 2:
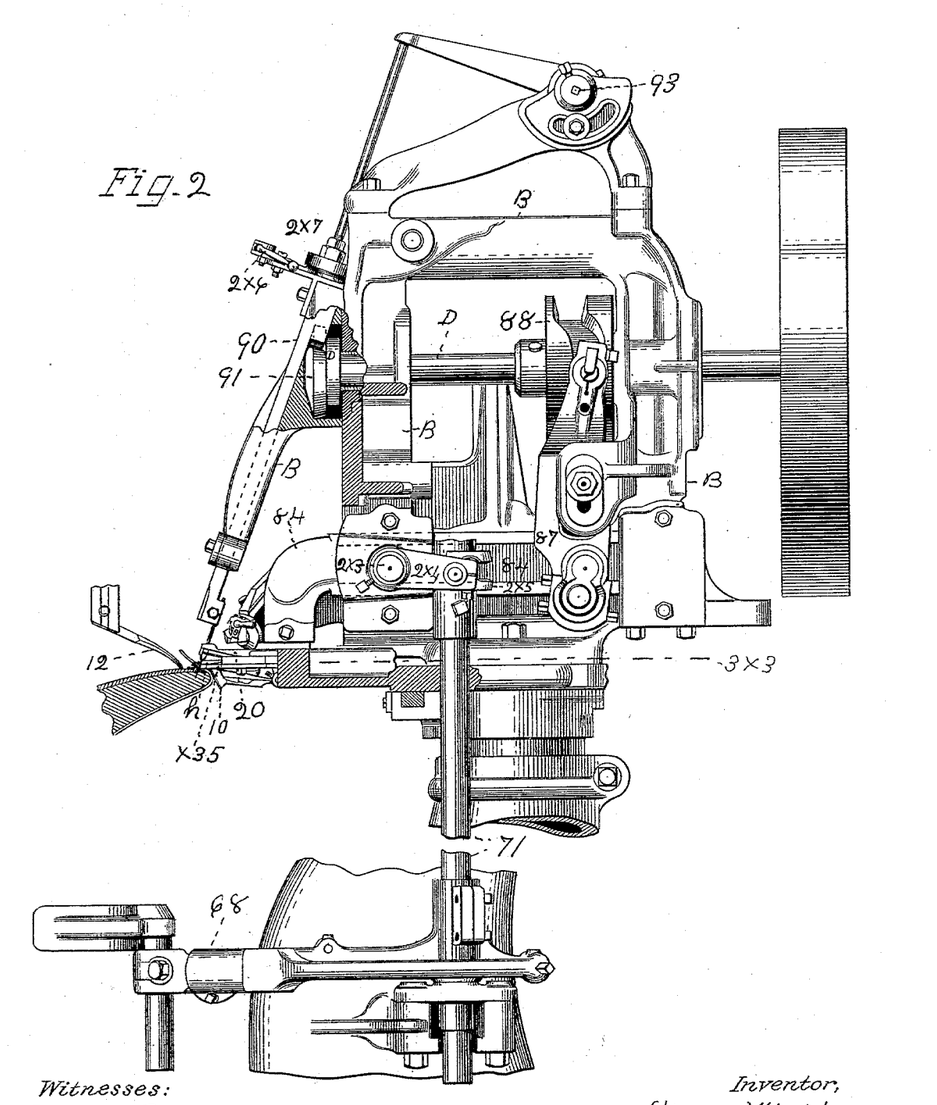
Fig. 2 is a side elevation of the machine-frame and parts of this invention separate from parts shown in Fig. 1.
Figure 3:
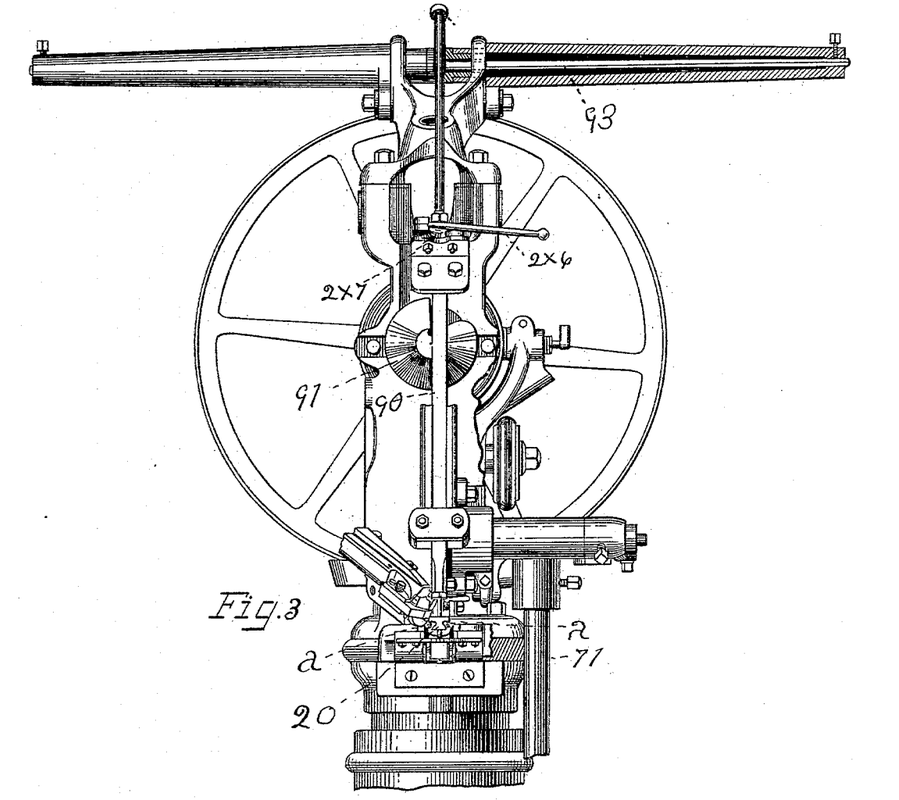
Fig. 3 is a front elevation of Fig. 2.
Figure 4:
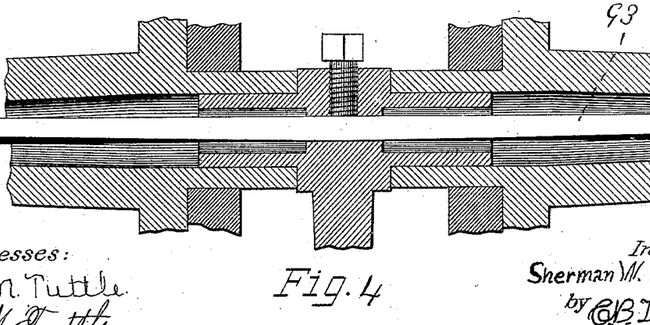
Fig. 4 is a sectional view, enlarged, of the driver-spring.

It may be here stated that in the lasting process as it is performed by the machine of the accompanying drawings, Fig. 1, the materials to be operated upon are prepared by putting them onto a last with the inner sole upon the bottom thereof, all in the usual way. The upper is drawn over at the heel, toe, and preferably at the sides also, and secured to the inner sole by a tack or other fastening device in each of said places. As such it is spoken of hereinafter as the "last" or "shoe." It is presented to the machine-bottom upwardly against the rest 12 and with the edge thereof against the edge rest 10, and is then in position for the upper-stretching devices, which in this instance include pincers and pincers-actuating appliances to come forward and grip the edge of the upper for pulling it over the last. The said bottom rest has its contact or bearing face in a plane parallel with the plane of the machine indicated by broken line $3^{\times 3}$, referred to hereinafter as the "horizontal plane of the machine," and the edge rest has its contact or bearing face in a plane approximately at right angles to said horizontal plane. In combining the work-presser and fastener-inserting appliances of this invention with said machine regard is had for the disposition thereof relatively to the said shoe-bottom and edge rests, whereby a shoe supported thereagainst shall be in position for receiving the presser and fasteners at the angle or inclination to be described. To this end the fastener-inserting mechanism, which in the present instance comprises mechanism adapted for delivering and driving loose tacks, has its tack-driving hammer-bar 90 supported to slide in the machine-frame B, its path or line of movement being in a plane oblique to the horizontal plane of the machine. It has connection with an arm on the steel bar 93, which, being suitably journaled in the machine-frame, is twisted by the uplifting movement of the hammer-bar. The hammer-bar is lifted by the cam 91 on shaft D against the twisting strain of said bar 93, which as the cam moves to permit it reverses the hammer-bar movement and thereby causes the insertion of a tack located beneath the bottom end thereof. The tack is supported below the hammer-bar at the driving-point by a carrier-block 20, having for that purpose a tack-receiving pocket or channel 83, into which the tack is discharged from suitable tack feeding and discharging mechanism. The driving operation is effected by the hammer-bar entering said pocket and moving forwardly against the tack and discharging it from the pocket into the material located therebelow. To facilitate this operation, the block 20 has its pocket formed between two pivoted parts $a\ a$, which are closed together by a spring 95, against which the parts are opened outwardly by the driving operation to permit passage of the tack therethrough. The carrier-block 20 is arranged with its said pocket in a plane oblique to the horizontal plane of the machine for alinement with the hammer-bar, whereby as the hammer-bar descends the tack is forced into the inner sole and forwardly toward the middle of the last in a line oblique to the surface plane of the material penetrated thereby.

Figure 5:
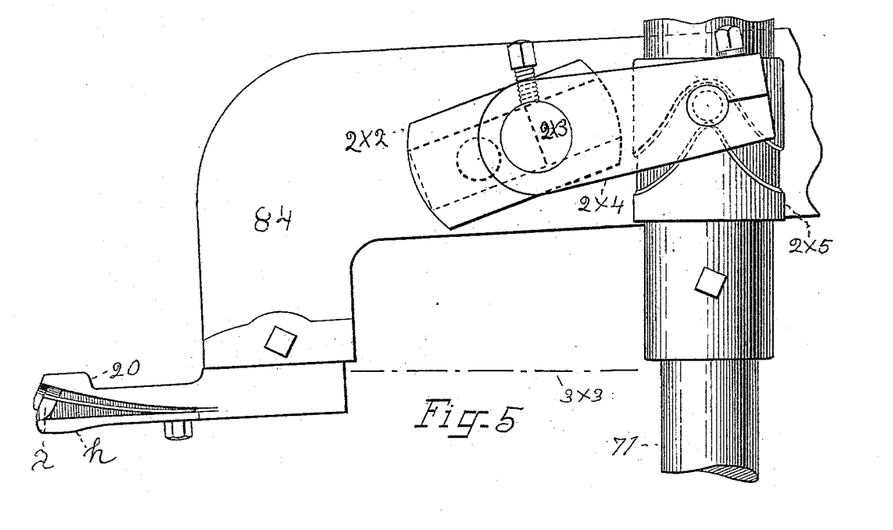
Figs. 5 and 6 are side elevations showing portions of the presser and connections.
Figure 6:
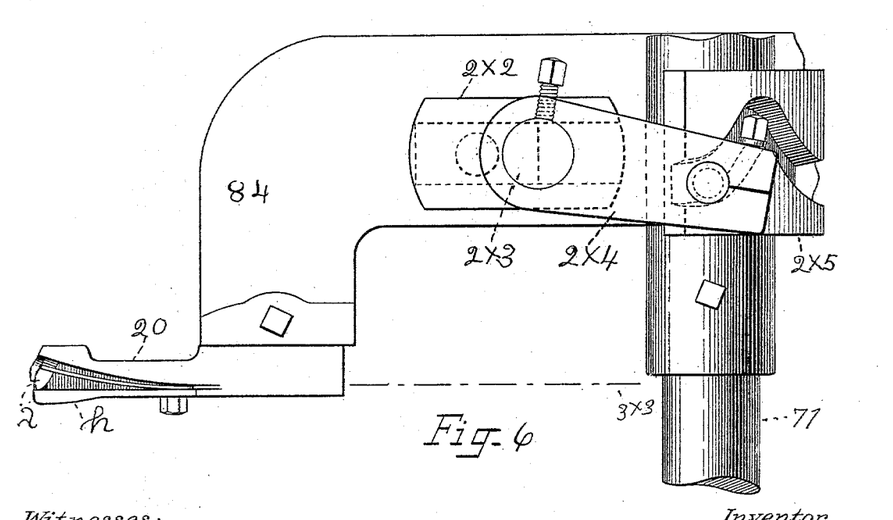
Figure 7:
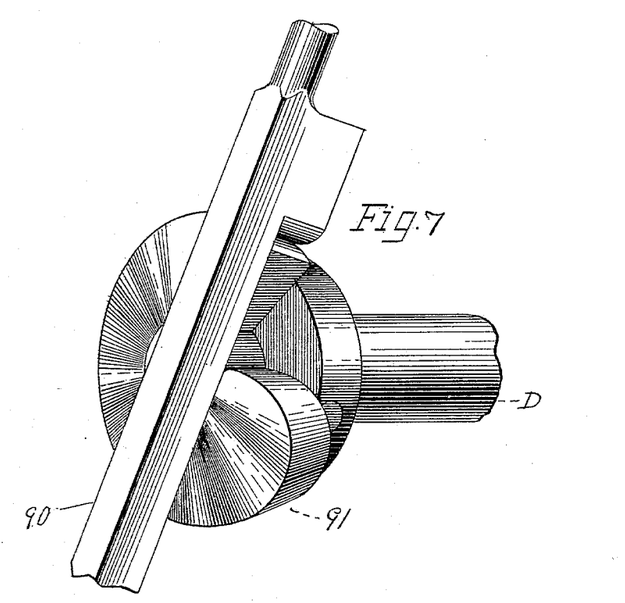
Fig. 7 is a perspective showing section of the hammer-bar and shaft with lifting-cam.
Figure 8:
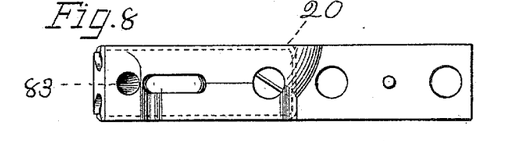
Figs. 8, 9, and 10 show the tack-carrier block and presser connected in plan and side elevation and in longitudinal section, respectively.
Figure 9:
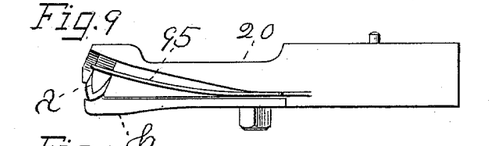
Figure 10:
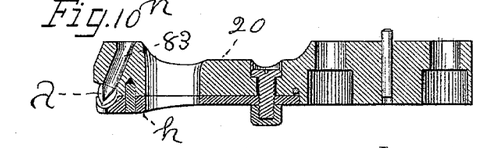
Figure 11:
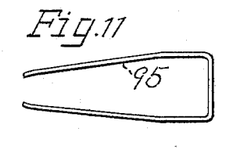
Fig. 11 shows spring detached from tack-carrier block.
Figure 12:
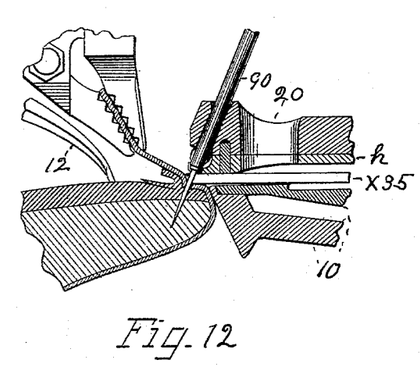
Figs. 12, 13, 14, and 15 show parts of the machine in different modes of operation.
Figure 13:
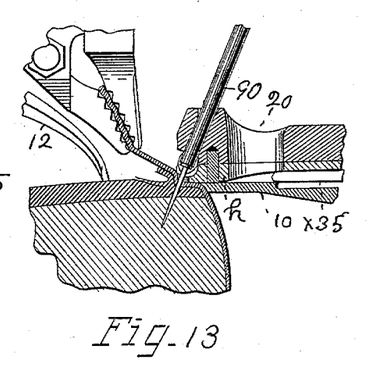
Figure 14:
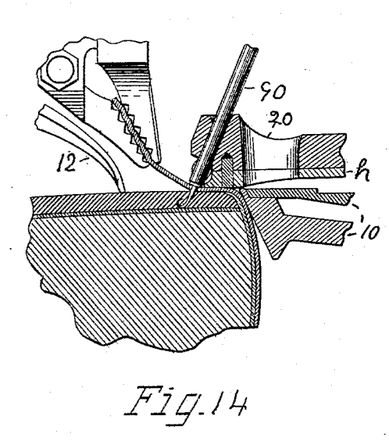
Figure 15:
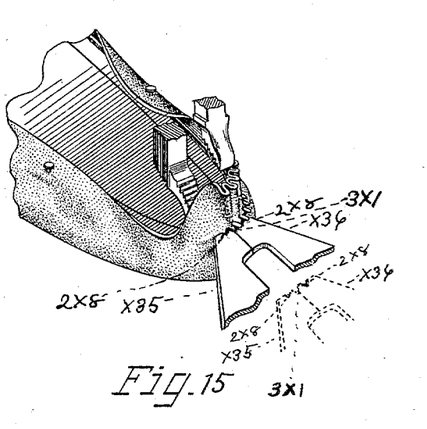

The carrier-block 20 is moved back and forth from the driving position to a retracted position beneath the raceway end of the tack-discharging mechanism, whereby to become loaded with a tack and incidentally give place for the intervening operations of the lasting devices, and for this purpose it has connection with a movable carrier-bar 84. Said carrier-bar is further employed for moving the work-presser $h$ into position for pressing the upper over the inner sole and backwardly therefrom. For convenience the presser, as shown in the present machine, is attached to the tack-carrier block 20, and is consequently moved therewith as one by the carrier-bar 84. Said carrier-bar has support in the machine-frame for endwise movement forwardly and backwardly and for tilting movements vertically. The lever 87 has one end pivotally connected with the carrier-bar 84 and has its other end in cam 88, on shaft D, whereby motion is imparted through the lever for moving the carrier-bar forwardly and backwardly, as desired. The carrier-bar 84 has a pin fixed thereto, on which is a slide, as indicated by dotted lines in Figs. 5 and 6, arranged for movement in a suitably-formed groove in the block $2^{\times 2}$. The block $2^{\times 2}$ has a journal-stud $2^{\times 3}$ arranged for support in the machine-frame B, and thereto is connected one end of the arm $2^{\times 4}$. Said arm has its opposite end in connection with a suitably-shaped cam $2^{\times 5}$ on shaft 71, wherethrough motion is imparted for lifting and depressing the arm $2^{\times 4}$ and rocking the stud $2^{\times 3}$, and consequently shifting the block $2^{\times 2}$, as required in order to effect the vertical movements of the carrier-bar 84. The relative disposition of said named parts is such that when the arm $2^{\times 4}$ is lifted to the elevated part of cam $2^{\times 5}$ it will support the block $2^{\times 2}$ with its slide-groove in a plane oblique to the central horizontal plane of the machine, Fig. 5, and the endwise movement of the carrier-bar 84 taking place at such time will cause the bar to move forwardly in a path or plane oblique to the central horizontal plane of the machine, and consequently the tack-block 20 and work-presser $h$ will approach the shoe by descending theretoward in a line or path of movement oblique to the plane of the part or section of the shoe inner sole to be covered thereby. Such, it may be understood, is the position of cam $2^{\times 5}$, while the shaft-arm 68 stands in the straight forward position with its forked end outermost; but a movement of the arm 68 to either side, producing a turn of the shaft 71 in either direction, operates the cam to depress the arm $2^{\times 4}$ and thereby shifts the block $2^{\times 2}$ to a position with its said groove in a horizontal plane, whereupon endwise movement of the carrier-bar 84 taking place at such a time will effect to move the carrier-block 20 and work-presser $h$ forwardly in a horizontal plane parallel with the horizontal plane of the machine and approximately parallel with the surface of the part of section of the shoe inner sole to be covered thereby.

The lasting-machine represented in the present instance has special provision and appliances for the work of lasting so-called "Goodyear" or "welted" shoes, and to that end the presser $h$ has its end or work bearing-face of an angular or blunted formation, whereby to bend and press the upper inwardly to the angle of union of the shoe inner sole and the channel-lip thereof, and connected with the hammer-bar are plate appliances having connection with the rod $2^{\times 6}$, whereby to be moved from and into position between a collar $2^{\times 7}$ on the hammer-bar and the machine-frame and thereby to vary and limit the downward movement of the hammer-bar for driving the tacks to different altitudes, the tacks being located from and toward the marginal edge of the shoe inner sole by the relative disposition of the edge rest 10.

The combination as a whole, including the shoe-rests and fastener mechanism, operates for locating the tacks in the angle of union of the shoe inner sole and channel-lip thereof and causing a limited or partial insertion thereof toward the central plane of the shoe in a line of movement oblique to the plane of the section or part of the inner sole penetrated thereby.

The machine also is provided with additional presser members $X^{35}$ $X^{36}$, located in a plane below the presser $h$ and having provision for movement in a horizontal plane forwardly and backwardly from a position for pressing the upper over the inner sole to a retracted position, whereby to give way for the intervening operations of the presser $h$. In this connection will be understood the vertical movements of the carrier-bar 84 in order to lift the presser $h$ to a plane above the plane of the pressers $X^{35}$ $X^{36}$, whereby to give way for the advance movements of said pressers and again to depress the carrier-bar for moving the presser $h$ to press the shoe-upper with its work-bearing face in a plane approximately the same as the plane of the pressers $X^{35}$ $X^{36}$.

Although required in the machine represented for giving place for the pressers $X^{35}$ $X^{36}$, the described vertical movements of the carrier-bar 84 and the consequent variation of the plane of forward movements of the work-presser $h$ has at times a further usefulness for differently presenting the presser $h$ to different parts of the upper during the lasting operation as a whole, and this arrangement is deemed preferable, although it is understood that in cases where not required to give way for other members the presser $h$ may be arranged for movement toward the upper in a fixed plane or path and, provided it approaches the upper in the oblique manner stated, the good results obtainable from that operation will follow.

The pressers $X^{35}$ $X^{36}$ each have a throat or recess $2^{x8}$ in the end thereof, and therebetween, when positioned foremost, is an opening or recess $3^{x'}$, occasioned by rounding or cutting away the adjacent corner part of the pressers. Through the opening $3^{x'}$ is passed the securing device or fastener from the fastener-inserting mechanism for securing the upper to the inner sole. All these are important features of this invention. It allows of a presser being positioned on a section of the lasted upper having a fastener previously inserted therethrough. Said fastener, having its raised part in the recess $2^{x8}$, is to a degree shielded and supported by the walls of the presser, while the bearing-face of the presser holds the said upper from being disturbed or unduly interfered with by the crimping devices and securing mechanism operating at one side of the presser for crimping or fulling the section of upper material next adjacent thereto. By this arrangement, too, the fastener-inserting mechanism is located for inserting a fastener at a predetermined distance from a previously-inserted fastener, which allows of the fasteners being spaced at intervals of uniform distances apart, according to the distance of the recess $2^{x8}$ from the inserting mechanism or the opening $3^{x'}$. In the disposition of said parts due regard is had for the kind and quantity of material to be operated upon, as well as the quantity of work or result to be obtained.

The machine represented has two pressers $X^{35}$ $X^{36}$, to be employed one for pressing and holding the upper, while the other is moved in the operation of crimping the upper, the functions being alternated for crimping or fulling the upper in different directions; but this invention is not limited to said construction. In practice the best results have been attained from an arrangement which operates for inserting the fastener approximately close to the side of the presser and in or near the plane of the foremost bearing-face of the presser. It may be here remarked also that the machine represented comprises mechanism for moving the upper-stretching devices in working the upper over the last and additionally moving said devices at times in crimping and fulling or working the upper laterally, and mechanism for moving the pressers $X^{35}$ $X^{36}$ to bear upon and press the shoe-upper. Said mechanisms, being suitably connected with the shaft 71, are actuated by a movement of the shaft-arm 68 to one side of the normal or straight forward position for starting the operations of the pressers $X^{35}$ $X^{36}$ and also the said additional movements of the stretching devices, and are actuated by a return movement of the shaft-arm into the straight forward position for suspending the operations of the pressers and the additional operation of the stretching devices, from which it is now to be observed that the movements of shaft-arm 68 for starting or suspending the operations of the work-pressers $X^{35}$ $X^{36}$ and the additional movements of the stretching devices operate the parts for simultaneously lifting and lowering the carrier-bar 84, whereby is relatively shifted the plane of forward movement of the work-presser $h$.

For the description of machine parts not referred to, or referred to but not fully described herein, reference is had to the United States Letters Patent above stated.

It will be understood as the result of this invention that the presser $h$ in the forward or work-pressing movement thereof goes gradually toward the surface plane of the shoe inner sole, whereby its pressure upon the upper is gradually increasing conformably with the increasing strain of the upper material, being greatest at the end of the forward movement, where, the stretching devices having then let go, it is best adapted for holding the strained upper material in place until the same is secured to the inner sole by a fastener inserted therethrough. This effect is further increased by the use of a more rigid presser or one having its work end of a sharper or more angular formation, as is allowable in this arrangement without liability of the presser colliding with and displacing the shoe from the shoe-resting members while moving forward.

The tack or fastener going forwardly in a line oblique to the inner sole operates for additionally straining the upper, and this additional strain of the ingoing fastener is an important feature or result of this invention, for while it is of a limited character still when the machine is of the character for lasting the shoe progressively the tacks are inserted step by step, and the effect of each is enhanced to a degree by the others. The result is a collective one for binding the upper more closely to the last. Another result is that in the after work of leveling down the superimposed parts of the upper at the shoe-heel or other places the fasteners are driven farther and the upper is thereby carried over which might otherwise "back-slack" or break down and wrinkle at the edge of the last.

It remains to be said that this invention is not to be understood as confined in usefulness to the machine herein represented, nor is it limited to the arrangement shown or the features of its adaptability and embodiment in said machine; but in other lasting-machines of the kind or character indicated the parts comprising this invention as now presented may be differently arranged or in part dispensed with, it being kept in mind for the arrangement to be so adapted that the presser shall approach the upper and the tack go into the shoe, both moving toward the central plane of the last in lines or paths of movement oblique to the surface plane of the part or section of the shoe inner sole to be acted upon thereby, due regard being made always for the character and relative dispositions of the shoe-resting and other mechanisms employed.

It is desired by Letters Patent to secure—

1. A lasting-machine, having means for pressing the upper in the angle of union of the shoe inner sole and channel-lip thereof, combined with means for supplying a nonyielding fastening medium, and a fastener-inserting mechanism for securing the upper to the inner sole, said mechanism operating to insert the fasteners through the upper in said angle of union, substantially as described.

2. A lasting-machine, having means for pressing the upper in the angle of union of the shoe inner sole and channel-lip thereof, combined with fastener-inserting mechanism for securing the upper to the inner sole, said mechanism operating to insert the fastenings through the overturned upper in said angle of union and obliquely toward the middle of the shoe, each of the inserted fasteners being independent of others, substantially as described.

3. A lasting-machine, having appliances for delivering and driving tacks, or like fasteners, including a part with a fastener-receiving pocket or channel, in which the fasteners are deposited preparatory for the driving operation, and means for resting the shoe for receiving the fastener with the fastener-receiving plane of the shoe inner sole oblique to the axis of said pocket or channel, substantially as described.

4. The combination, with the rest for gaging the position of the last and means for pulling the upper over the inner sole, of a fastener-inserting mechanism arranged with relation to said rest as described whereby the fastener is inserted through the edge of the pulled-over upper in a direction oblique to the plane of the fastener-receiving surface of the inner sole, each of the inserted fasteners being independent of others, substantially as described.

5. A lasting-machine, having a fastener-inserting mechanism, and shoe edge and bottom rests, the same being relatively disposed for resting the shoe for receiving the fastener with the fastener-receiving plane of the shoe inner sole oblique to the line of movement of the ingoing fastener, substantially as described.

6. A lasting-machine, having a fastener-inserting mechanism, and a shoe-resting mechanism, said mechanisms being relatively disposed for resting the shoe for receiving the fastener with the plane of the fastener-receiving part of the shoe inner sole oblique to the line of movement of the ingoing fastener, substantially as described.

7. A lasting-machine, having a fastener-inserting mechanism in combination with a shoe-resting mechanism, the combination operating for resting the shoe with the plane of the fastener-receiving part of the shoe inner sole oblique to the line of movement of the ingoing fastener, the fastener being inserted toward the central plane of the shoe, substantially as described.

8. A lasting-machine comprising means for operating upon different parts of the upper at different times by repeated operations of the machine, having a work-presser adapted for movement toward the shoe, in a line oblique to the horizontal plane of the machine, substantially as described.

9. A lasting-machine comprising means for operating upon different parts of the upper at different times by repeated operations of the machine, having a work-presser and a rocking part in which the presser is supported for movement toward and from the upper combined with means for moving the presser to press the upper, and means for rocking the movable part to vary or shift the plane of forward movement of the work-presser, substantially as described.

10. A lasting-machine, having lasting appliances, movable for lasting the upper over the last and differently movable for fulling or crimping the upper, a work-presser adapted for movement in different planes toward the shoe-upper and means for moving the presser to press the upper, combined with means wherethrough a shift in the operative movements of the lasting appliances operates to vary or shift the plane of forward movement of the work-presser, substantially as described.

11. A lasting-machine, having a work-presser adapted to move inward over the edge of the upper in a direction inclined toward the surface of the material operated upon combined with means for actuating said work-presser, substantially as described.

12. A machine of the character indicated, comprising means for operating upon different parts of the upper at different times by repeated operations of the machine, having a work-presser and means for moving the presser to press the upper combined with means to vary or shift the plane of forward movement of the work-presser, substantially as described.

13. A lasting-machine comprising means for operating upon different parts of the upper at different times by repeated operations of the machine, having a work-presser, and means for moving the presser to press the upper combined with means controllable by the workman to vary or shift the line of forward movement of the work-presser, when desired, substantially as described.

14. A lasting-machine, having a work-presser and means for moving the presser to press the upper, combined with a part for resting the shoe, said part having its contact or bearing face in a plane oblique to the plane of forward movement of the work-presser, substantially as described.

15. A lasting-machine, having a movable work-presser and shoe edge and bottom-rests for resting the shoe, the same being relatively disposed for resting the shoe with the presser-receiving part or plane of the shoe inner sole oblique to the plane of forward movement of the work-presser, and means for moving the presser to press the shoe-upper, substantially as described.

16. A lasting-machine, having a movable work-presser and a shoe-resting mechanism, said resting mechanism being relatively disposed for resting the shoe with the presser-receiving plane of the shoe inner sole oblique to the plane of forward movement of the work-presser, and means for moving the presser to press the shoe-upper, substantially as described.

17. A lasting-machine, having a movable work-presser and a shoe-resting mechanism, said resting mechanism being relatively disposed for resting the shoe with the presser-receiving plane of the shoe inner sole oblique to the plane of forward movement of the work-presser, combined with means for moving the presser to press the shoe-upper, and a securing mechanism for securing the upper to the inner sole, substantially as described.

18. A lasting-machine, having a movable work-presser, combined with a shoe-resting mechanism and a fastener-inserting mechanism, the said mechanisms being relatively disposed for resting the shoe for receiving the fastener with the plane of the fastener-receiving part or section of the shoe inner sole oblique to the line of movement of the ingoing fastener, and means for moving the work-presser to press the shoe-upper, substantially as described.

19. A lasting-machine, having a movable work-presser, a fastener-inserting mechanism, and a shoe-resting mechanism, the said mechanisms being relatively arranged for resting the shoe with the part or section of the shoe inner sole to be acted upon oblique to the plane of forward movement of the work-presser and also oblique to the line of movement of the ingoing fastener, and means for moving the presser to press the upper, substantially as described.

20. A lasting-machine of the character indicated having a work-presser arranged at an altitude above the bottom of the shoe inner sole, and movable toward the central plane of the shoe in a line oblique to the presser-receiving surface of the shoe inner sole combined with means for moving the presser to press the shoe-upper, substantially as described.

21. A lasting-machine having upper-lasting appliances adapted for working the upper over the last, combined with a fastener-driving mechanism, and a shoe-resting mechanism, the said mechanisms being relatively disposed for resting the shoe with the plane of the fastener-receiving surface of the shoe inner sole oblique to the line of movement of the ingoing fastener, the fastener being driven through the overturned upper toward the central plane of the last, substantially as described.

22. A lasting-machine having upper-holding devices and means for pulling the upper held thereby, combined with a movable work-presser and a shoe-resting mechanism, the same being relatively arranged for resting the shoe with the presser-receiving plane of the shoe inner sole oblique to the plane of forward movement of the work-presser and means for moving the presser to press the upper, and means for securing the upper to the inner sole, substantially as described.

23. A lasting-machine having upper-holding devices, and means for pulling the upper held thereby, and a presser and means for moving the presser to press the upper upon the inner sole preparatory for the securing operation, combined with a fastener-inserting mechanism, and a shoe-resting mechanism, the combination operating for resting the shoe with the plane of the fastener-receiving part or section of the shoe inner sole oblique to the line of movement of the ingoing fastener, substantially as described.

24. A lasting-machine having upper-lasting appliances for working the upper over the last and in to the angle of union of the shoe inner sole and channel-lip thereof combined with a securing mechanism comprising means adapted for feeding and delivering tacks or like fasteners, and driving connections adapted for causing a limited or partial insertion of the fastener relatively to the surface penetrated by the body parts thereof, and means for resting the shoe for receiving the fasteners, the combination operating to rest the shoe for receiving the fasteners with the plane of the fastener-receiving part of the shoe inner sole oblique to the line of movement of the ingoing fastener, the fastener being located at the said angle of union of the inner sole and channel-lip thereof, substantially as described.

25. A lasting-machine having a plurality of work-pressers, and means for moving the pressers to press the upper, combined with means for shifting the relative positions of the pressers whereby different pressers are at different times presented for pressing the upper with their work-bearing faces in approximately the same position, substantially as described.

26. A lasting-machine having a plurality of work-pressers, and means for moving the pressers to press the upper, combined with means under control of the workman for shifting at will the relative positions of the pressers whereby different pressers are at different times presented for pressing the upper with their work-bearing faces in approximately the same position, substantially as described.

27. A lasting-machine having a plurality of work-pressers, and means for moving the pressers to press the upper, combined with means for shifting the relative positions of the pressers whereby different pressers are at different times presented for pressing the upper with their work-bearing faces in approximately the same position, and means wherethrough a presser is automatically suspended or removed from operating in the common position during the operation of another presser in said position, substantially as described.

28. A lasting-machine having a plurality of work-pressers, and means for moving the pressers to press the upper, combined with means for shifting the relative positions of the pressers whereby different pressers are at different times presented for pressing the upper with their work-bearing faces in approximately the same position, and means wherethrough the shifting of a presser to begin operation in the common position simultaneously operates the suspension or removal of a presser from said position, substantially as described.

29. A lasting-machine having a plurality of work-pressers, and means for moving the pressers to press the upper, combined with means for shifting the relative positions of the pressers whereby different pressers are at different times presented for pressing the upper with their work-bearing faces in approximately the same position, and means to suspend or remove a presser from the common position during a number of repeated operations by another presser in said position, substantially as described.

30. A lasting-machine having a plurality of work-pressers arranged one above another in different planes, combined with means for moving the pressers to press the upper, and means for changing the relative position of the pressers whereby said pressers are adapted for pressing the upper with their work-bearing faces in approximately the same plane, substantially as described.

31. A lasting-machine having a work-presser provided at its work-bearing end with a notch or recess, combined with a fastener-inserting mechanism adapted for inserting fasteners at a distance to one side of said notch or recess, substantially as described.

32. A lasting-machine having a fastener-inserting mechanism and means at a distance from the fastener-inserting mechanism adapted for engagement with a fastener inserted thereby, the combination operating to fix the distance from the engaged fastener to the fastener inserted by the next operation of the fastener-inserting mechanism, substantially as described.

33. A lasting-machine, having a plurality of work-pressers adapted for pressing the upper with their bearing-faces in approximately the same locality or place, and means for moving the pressers to press the upper, substantially as described.

34. A lasting-machine having a work-presser with means for engaging a tack or other securing device, combined with upper-crimping devices, for crimping the section of upper next adjacent to the presser and a securing mechanism arranged to one side of the presser for securing the upper to the inner sole, substantially as described.

35. A lasting-machine, having a plurality of work-pressers for pressing the upper over the inner sole, arranged with an opening or recess therebetween for passage of tacks or other suitable upper-securing medium, and a securing mechanism adapted for putting the securing medium through said opening, into the upper and inner sole, substantially as described.

36. A lasting-machine, having means for delivering tacks, or like fasteners, and driver connections for causing limited or partial insertion of the fasteners, combined with a presser having a recess or cavity for receiving the raised part of an inserted fastener, and appliances for lasting the upper at one side of the presser, substantially as described.

37. A lasting-machine having means for delivering tacks, or like fasteners, and driver connections for causing limited or partial insertion of the fasteners, combined with means for resting the shoe for receiving the fasteners, the combination operating to locate the fasteners in the angle of union of the shoe inner sole and the channel-lip thereof and a presser having a recess or cavity for receiving the raised part of an inserted fastener and appliances for lasting a section of the upper at one side of the presser, substantially as described.

38. A lasting-machine having a presser for holding the upper in the angle of union of the shoe inner sole and channel-lip thereof, combined with appliances for lasting a section of the upper at one side of the presser and means for securing said section of upper to the inner sole, said means operating to locate the securing medium in the angle of union of the shoe inner sole and channel-lip, substantially as described.

39. A lasting-machine comprising means for operating upon different parts of the upper at different times by repeated operations of the machine, comprising a plurality of work-pressers and means for presenting a presser at varying inclinations to the work, substantially as described.

40. In a lasting-machine, the combination of rests to gage the work, with a fastener-holding device holding and directing the fastener obliquely toward the middle of the shoe and obliquely also to the plane of the fastener-receiving part of the inner sole, and mechanism for driving the fasteners, substantially as described.

41. In a lasting-machine a fastener-holding device, holding and directing the fastener obliquely toward the middle of the shoe and obliquely also to the plane of the fastener-receiving part of the inner sole, and mechanism for driving the fastener, substantially as described.

42. In a lasting-machine comprising means for operating upon different parts of the upper at different times by repeated operations of the machine, a wiper and mechanism for presenting the wiper at varying inclinations to the work, substantially as described.

Signed at Lynn, Massachusetts, this 31st day of March, A. D. 1897.

SHERMAN W. LADD.

Witnesses:
  C. B. TUTTLE,
  A. M. TUTTLE.